United States Patent
Wolf

(10) Patent No.: US 6,707,828 B1
(45) Date of Patent: Mar. 16, 2004

(54) SYNCHRONIZATION OF A NETWORK ELEMENT IN A SYNCHRONOUS DIGITAL COMMUNICATIONS NETWORK

(75) Inventor: Michael Wolf, Mundelsheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/478,195

(22) Filed: Jan. 5, 2000

(30) Foreign Application Priority Data

Jan. 16, 1999 (DE) .......................................... 199 01 588

(51) Int. Cl.[7] .................................................. H04J 3/06
(52) U.S. Cl. ........................................ 370/503; 375/356
(58) Field of Search ................................ 370/503, 507, 370/509, 512, 510, 513; 375/356

(56) References Cited

U.S. PATENT DOCUMENTS

| | | | |
|---|---|---|---|
| 5,271,001 A | * | 12/1993 | Hadano |
| 5,886,996 A | * | 3/1999 | Wolf |
| 5,982,746 A | * | 11/1999 | Hanson et al. |
| 6,163,551 A | * | 12/2000 | Wolf |
| 6,169,753 B1 | * | 1/2001 | Yoshida |
| 6,314,114 B1 | * | 11/2001 | Coyle et al. |
| 6,317,439 B1 | * | 11/2001 | Cardona |
| 6,317,475 B1 | * | 11/2001 | Kasurinen |
| 6,560,245 B1 | * | 5/2003 | Slater |

FOREIGN PATENT DOCUMENTS

| | | |
|---|---|---|
| DE | 0 38 33 940 A1 | 4/1990 |
| DE | 43 95 760 T1 | 10/1995 |
| EP | 0 723 344 A2 | 7/1996 |
| EP | 0 849 904 A2 | 6/1998 |
| EP | 0 891 051 A2 | 1/1999 |
| JP | 10322379 A | 12/1998 |
| WO | WO 0 92/07433 | 4/1992 |
| WO | WO 092/07433 | 4/1992 |

* cited by examiner

Primary Examiner—Ajit Patel
Assistant Examiner—Steven A. Blount
(74) Attorney, Agent, or Firm—Sughrue Mion, PLLC

(57) ABSTRACT

A network element is provided for receiving receives message signals and reading the synchronization status messages contained therein. The network element transmits the message signals to a central network management facility which selects one of the message signals as a timing reference based on the synchronization status messages and based on stored information about the structure and configuration of the network. The network management facility then notifies the network element of the selection. The network element derives a clock signal from the selected message signal and uses this clock signal to adjust an internal clock generator. Because the network management facility also has information about parallel transmission paths, the creation of timing loops is effectively prevented.

7 Claims, 3 Drawing Sheets

SYNCHRONIZATION OF A NETWORK ELEMENT IN A SYNCHRONOUS DIGITAL COMMUNICATIONS NETWORK

BACKGROUND OF THE INVENTION

This invention relates to a method of synchronizing network elements in a synchronous digital communications network, to a network element for a synchronous digital communications network, and to a network management facility.

The network elements of a synchronous digital communications network operate according to the recommendations of the ITU-T for synchronous digital hierarchy (SDH) or for the Synchronous Optical Network (SONET). By "network elements", add-drop multiplexers, crossconnects, or line multiplexers are understood. During the transmission of information in such a communications network it is essential that all network elements operate in synchronism. This is achieved by mutual synchronization of the network elements or by master-slave synchronization, in which each network element derives a clock signal from a received message signal and synchronizes its internal clock generator with this external clock signal. One or more primary reference clock generators supply a highly accurate reference clock for the network.

To improve the selection of a message signal as a timing reference, a synchronization status message (SSM) was introduced, which is transmitted as part of the message signal. The SSM indicates the quality of the reference clock to which the transmitting network element is synchronized. The selection of a timing reference is based on the SSM: A network element selects that information signal as a timing reference whose SSM indicates the highest clock quality. As SSM, the message "DNU" ("do not use for synchronization") was defined, which is to be transmitted in the return direction to the network element whose information signal was selected as the timing reference.

During synchronization, care must be taken to ensure that no timing loops are created, i.e., that two network elements do not select each other as a synchronization clock source. The risk that timing loops are created is particularly great if two or more parallel transmission paths are present between two network elements. Such parallel transmission paths are also referred to as "bundles". By the use of the SSM "DNU" alone, the creation of timing loops cannot be avoided in all possible situations.

To avoid timing loops, European Patent Application EP 0 723 344 proposes to define two classes of interface devices. Only information signals that are received at an interface device of the first class may be selected as a timing reference, while information signals that are received at interface devices of the second class must be ignored in selecting a reference clock. By suitable configuration of the network, e.g., by connecting only interfaces of the first class to interfaces of the second class, timing loops can be avoided. However, this solution is prone to error, since it depends on the correct network configuration. Particularly if bundles of parallel transmission paths are present, errors may creep into the configuration, which then result in the creation of timing loops.

European Patent Application EP 0 849 904 proposes another way of avoiding timing loops. The selection of a reference clock is made in a central clock generator of a network node. The selected clock source is communicated to a central network management facility which then instructs each network element of the node that receives its reference clock from the central clock generator which SSM to send at which of its outputs. In this way, the SSM "DNU" can be sent at all outputs involving the risk of the creation of timing loops, whereby the creation of timing loops is effectively prevented. However, this method is complex, because the network management facility must explicitly assign an SSM to each output of each network element. This method, too, depends essentially on the correct configuration of the network. In addition, several clock interfaces with means for transmitting an SSM must be provided between the clock generator and the network elements. This, too, adds to the complexity and cost of equipment, and is not provided for in currently available network elements.

SUMMARY OF THE INVENTION

It is an object of the invention to provide a method of synchronizing a network element which reduces the risk of the creation of timing loops, particularly in the presence of parallel transmission paths, but which manages with simple technical means. Further objects of the invention are to provide a network element and a network management facility which are suitable for carrying out the method.

The first-mentioned object is attained by the features of claim 1, and the further objects are attained by the features of claims 6 and 7, respectively. Further advantageous aspects of the invention are defined in the dependent claims.

BRIEF DESCRIPTION OF THE DRAWINGS

The invention will become more apparent by reference to the following description of two embodiments taken in conjunction with the accompanying drawings, in which.

DETAILED DESCRIPTION OF THE INVENTION

A fundamental idea of the invention is to select a timing reference by means of a central network management facility rather than a network element or a central clock generator. In the network management facility, which is present anyhow, all information about the structure and configuration of the network is stored. Another fundamental idea is that when a network element determines the need for a new selection, it transmits to the network management facility, for all message signals received at its inputs, the respective synchronization messages within the message signal, then selects one of the received message signals as a new timing reference based on the transmitted synchronization status messages and on the stored information about the structure and configuration of the network, and notifies this selection to the network element.

As is well known, the transmission of information between network elements and the central network management facility over the existing Q interfaces may take a few seconds to minutes. The invention, however, is based on recognition that the information transmission in the communications network will not be appreciably degraded if after a loss or a failure of its reference clock source, a network element is not immediately resynchronized. In that case, according to the invent-ion, a network element will switch to the free, unsynchronized mode—the so-called holdover mode—and wait until it is notified by the network management facility of a new selection. Delays up to a few minutes caused by the information transmission through the Q interface as well as waiting and processing times in the network management facility are uncritical for the operation of the network.

Alternatively, after a loss of its reference clock source, a network element may itself select a new reference clock source, as is commonly done in the prior art. This selection, however, is only temporary in order to bridge the time until a new reference clock source is selected by the network management facility. After the network management facility has communicated a new reference clock source to the network element, the latter switches to the new reference clock source.

Figure 1:
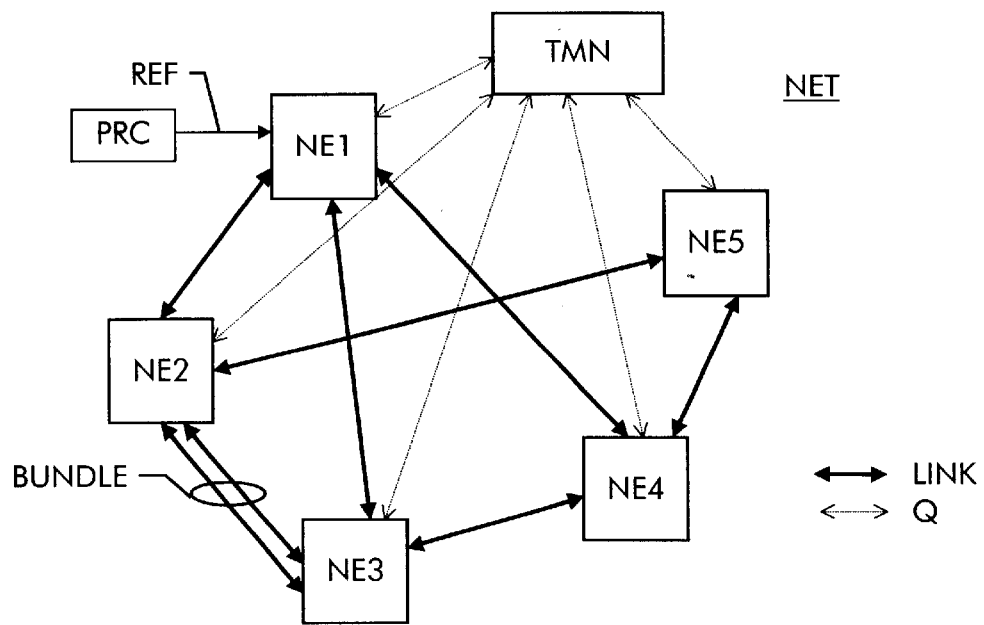
FIG. 1 shows a synchronous digital communications network.

A synchronous digital communications network NET based on the recommendations for synchronous digital hierarchy (SDH) is shown in FIG. 1. It consists of a number of network elements NE1–NE5, which are bidirectionally interconnected by optical or electrical transmission media LINK, and a central network management facility TMN. The network management facility TMN serves to switch logical connections between the network elements, to monitor error messages and alarms, and to configure the network NET. In addition, according to the invention, the network management facility TMN is designed to assign a reference clock source to each network element. At the network element NE1, a highly accurate reference clock signal REF from a primary reference clock PRC is fed into the network.

The network elements NE1–NE5 exchange synchronous message signals structured in the form of synchronous transport modules STM-N over the transmission media LINK. Synchronization is accomplished by selecting a received message signal as a timing reference for each network element, deriving a clock signal from the selected message signal in the network element, and adjusting the internal clock generator of the network element with this clock signal. If a link between two network elements fails, resynchronization may become necessary. This involves selecting another received message signal as a new timing reference for the two network elements.

The selection of a reference clock source is made by means of synchronization status messages SSM which are contained in and transmitted with the synchronous transport modules and indicate the respective clock quality of the sending network element. For the SSMs, the messages listed in Table 1 have been defined.

TABLE 1

| Synchronization status messages | | |
|---|---|---|
| Quality | Stability requirement | Use |
| G.811 | 10E-11 Long-term frequency departure | Primary reference clock generator (PRC) |
| G.812T | 5*10E-10 Offset 10E-9 Day drift | Transit node (SSU-transit) |
| G.812L | 10E-8 Offset 2*10E-8 Day drift | Local node (SSU-local) |

TABLE 1-continued

| Synchronization status messages | | |
|---|---|---|
| Quality | Stability requirement | Use |
| G.813 | 5*10E-8 Offset 5*10E-7 Day drift | Synchronous Equipment clock (SEC) |
| DNU | Do not use (for synchronization) | |
| Unknown | Quality unknown | |

If a network element selects another network element as a reference clock source by means of the SSM, it must send the SSM "DNU" in the return direction in order to notify the selected network element that the message signals must not be used as a timing reference in the return direction, because otherwise a timing loop would be created. On bundles BUNDLE of parallel transmission paths as are shown in FIG. 1 between network elements NE2 and NE3, the SSM "DNU" would have to be sent on both paths. A timing loop could also be created over several network elements interconnected in the form of a ring, such as network elements NE2, NE3, NE4, NE5 in FIG. 1. In such a configuration, the creation of timing loops cannot be avoided by the use of the SSM alone. However, since, according to the invention, the selection of a reference clock source for each network element is made in the network management facility TMN, and the latter has all necessary information about the configuration of the network, the creation of timing loops during the synchronization of a network element or during resynchronization after a failure can be effectively avoided taking into account the respective received SSM and the information about the network configuration. Advantageously, in addition to the network configuration, the information about the selected reference clock sources of the individual network elements is taken into account in the selection.

Figure 2:
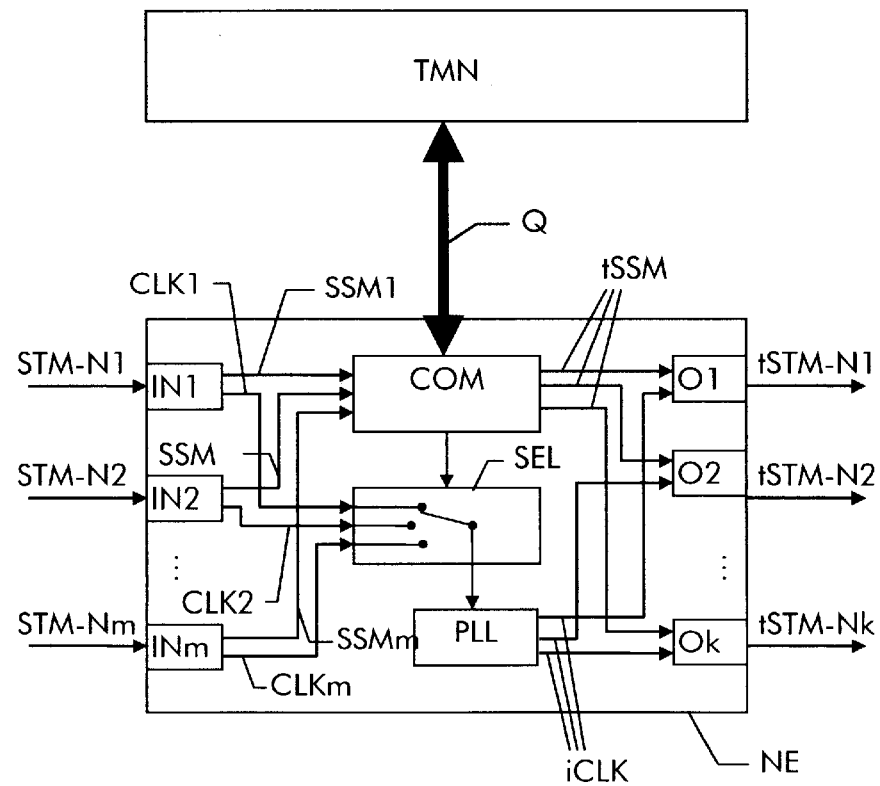
FIG. 2 is a block diagram of a network element in accordance with the invention and of a network management facility.

FIG. 2 shows one embodiment of a network element in accordance-with the invention. A network element NE has m inputs, at which it receives message signals STM-N1 to STM-Nm, respectively. The message signals are structured as synchronous transport modules STM-N of multiplex level N (N=1, 2, 4, 16, . . . ) for SDH systems. Via a Q interface Q, the network element communicates with a central management facility TMN. The block diagram shows only those devices and connections of the network element NE which are essential for synchronization.

At each of its m inputs, the network element NE has an interface circuit IN1–INm. In each interface circuit, a clock signal CLK1–CLKm is derived from the received message signal. The clock signals CLK1–CLKm are fed over respective connections to a selection device SEL. The interface circuits IN1–INm also read synchronization status messages SSM1–SSMm contained in an overhead area of the synchronous transport modules STM-N1 to STM-Nm, and pass them to a communication unit COM. The communication unit COM is connected via the Q interface Q to the network management facility TMN. It sends to the network management facility TMN the synchronization status messages SSM1–SSMm together with information as to which of the received message signals the respective synchronization status message stems from. The network management facility TMN then evaluates the synchronization status messages and, based on these messages and on stored information about the configuration of the communications network, selects one of the derived clock signals CLK1–CLKm as a timing reference. It notifies the selection via the Q interface to the communication unit COM of the network element NE. The communication unit COM passes the notification on to the selection unit SEL, which in response thereto transfers the selected clock signal to an internal clock generator PLL. The communication unit COM may for instance be the controller of the network element, the so-called network element manager.

The internal clock generator PLL may for instance be a digital phase-locked loop which, in the free, unsynchronized mode, generates a clock signal with the quality defined in ITU-T G.812. When a clock signal has been transferred by the selection unit SEL to the internal clock generator PLL, the clock signal synchronizes the clock generator PLL. An output signal iCLK of the clock generator PLL is distributed as an internal reference clock to all output circuits O1–Ok. Thus, message signals to be transmitted, tSTM-N, are generated and transmitted at the internal reference clock rate iCLK.

As a rule, at least some of the interface circuits IN1–INm of the network element NE incorporate timing recovery circuits, so that clock signals CLK1–CLKm are derived from the message signals STMN1–STMNm received at these interface circuits. One of these clock signals is then selected as a reference clock by the selection unit SEL in accordance with the selection made by the network management facility TMN. Alternatively, only one timing recovery circuit may be provided which derives the reference clock signal from the respective selected message signal.

In a preferred embodiment, the network management facility also notifies the network element NE via the Q interface Q and the communication unit COM of a synchronization status message tSSM for each output O1–Ok. This makes it possible to use the SSM "DNU" ("do not use for synchronization") in all directions with respect to the selected reference clock source, so that network elements which do not use the synchronization method according to the invention but themselves make a selection by means of the SSM can also be operated in the communications network. Alternatively, the network element NE may use the SSM of the received message signal selected as a timing reference, as is provided by the standardization, since the creation of timing loops is avoided by the network management facility TMN by taking into account the information stored therein about the structure and configuration of the communications network.

Figure 3:
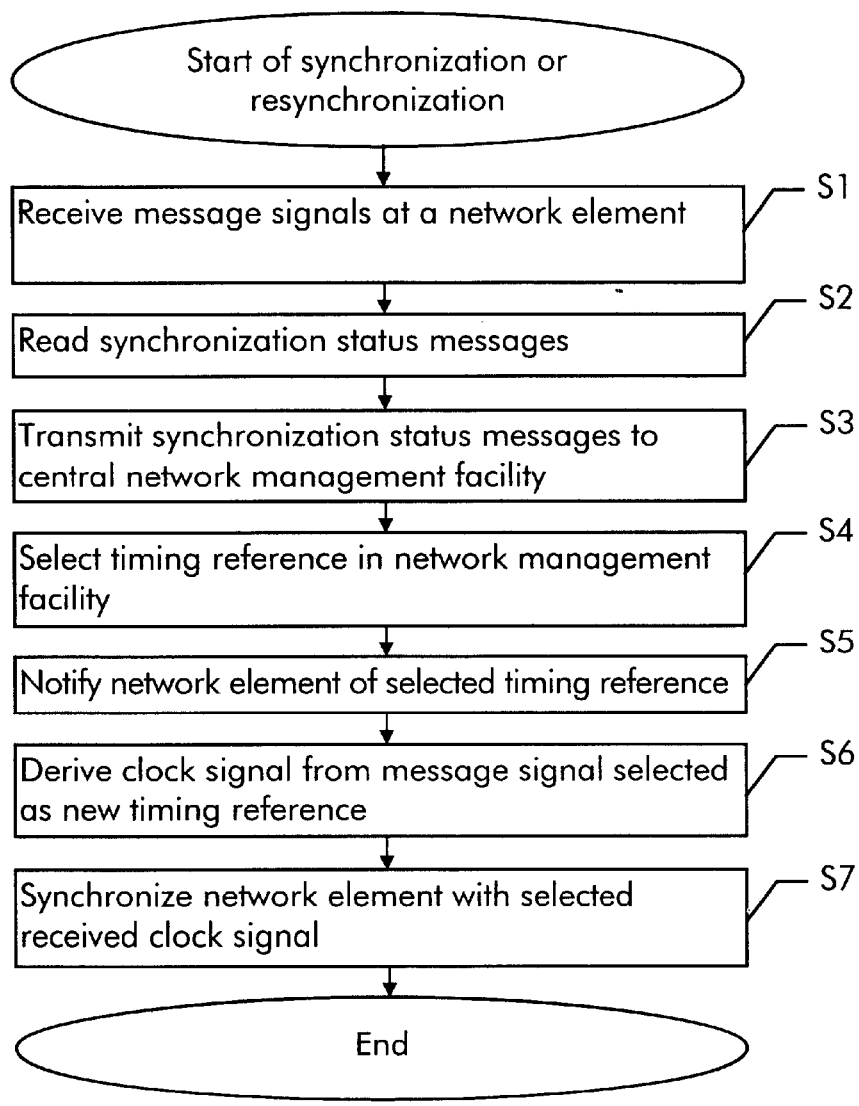
FIG. 3 is a flowchart of the method in accordance with the invention.

The method of the embodiment is shown as a flowchart in FIG. 3. The method is carried out when a network element is to be synchronized or when a network element has lost its reference clock source due to of a malfunction and is to be resynchronized. The method comprises the following steps:

Step S1: At the network element to be synchronized, several message signals are received. One of these message signals is to be used as a new timing reference. All received message signals contain a synchronization status message.

Step S2: The synchronization status messages of the individual received message signals are read by the network element.

Step S3: The network element transmits the read synchronization messages, together with information as to which message signal the respective synchronization status message stems from or as to the input where the respective message signal was received, to the central network management facility.

Step S4: Based on the synchronization status messages, the received information about the origin of the respective synchronization status message, and the stored information about the structure and configuration of the communications network, the network management facility selects one of the message signals as a new timing reference.

Step S5: The network management facility notifies the network element of the selection made.

Step S6: The network element derives a clock signal from the selected message signal.

Step S7: Using the clock signal derived from the selected message signal, the network element adjusts its internal clock generator in order to synchronize with the new reference clock source.

Figure 4:
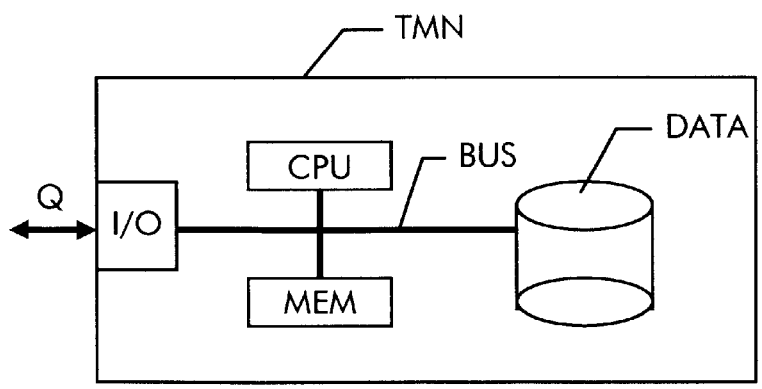
FIG. 4 is a block diagram of a network management facility in accordance with the invention.

The network management facility shown in FIG. 4 has means for receiving the synchronization status messages transmitted by a network element, means for storing information about the structure and configuration of the communications network, and means for selecting a timing reference for a network element based on the transmitted synchronization status messages and on stored information. Advantageously, the network management facility contains a Q interface circuit I/O, which is connected to the Q interface Q specified for communications networks, a semiconductor memory MEM for temporarily storing a selection request from a network element and intermediate results of the selection algorithm, a data memory with a database DATA in the form of, e.g., a hard disk, a processor, CPU, which performs the selection by means of a control program, and a bus system which interconnects the Q interface circuit I/O, the semiconductor memory MEM, the data memory DATA, and the processor CPU. The database incorporated in the data memory contains all information about the structure and configuration of the communications network.

Figure 5:
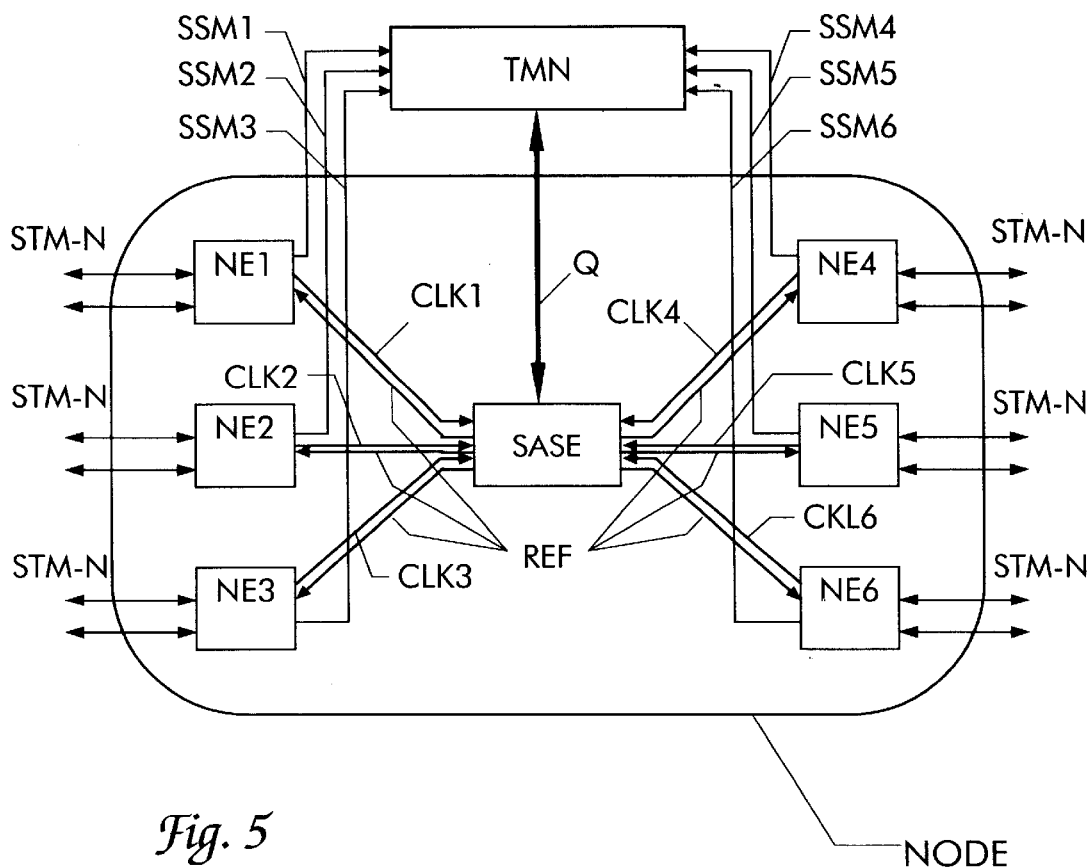
FIG. 5 is a block diagram of a network node.

Just as for the selection of a reference clock source of a single network element, the invention can be used for the selection of a reference clock source for a network node NODE containing several network elements NE1–NE6 and a central node clock generator SASE. This is shown schematically as a second embodiment in FIG. 5. The network node NODE contains six network elements NE1–NE6 and the central node clock generator SASE. The node clock generator SASE may be installed in the node as a separate device or incorporated in one of the network elements, preferably in a crossconnect. Each of the network elements NE1–NE6 sends to the node clock generator SASE a clock signal CKL1–CKL6 derived from a received message signal STM-N. The node clock generator synchronizes with one of these clock signals and retransmits a common reference clock signal REF to all network elements. The network elements NE1–NE6, in turn, synchronize with the reference clock signal REF received from the node clock generator SASE.

The network node NODE is connected with a central network management facility TMN. Both each of the network elements and the central node clock generator SASE are linked to the network management facility TMN. The network elements send to the network management facility TMN the synchronization status message SSM1–SSM6 contained in the received message signal from which the respective clock signal CLK1–CLK6 transferred to the node clock generator SASE was derived. Based on the received synchronization status messages SSM1–SSM6 and on data stored in the network management facility TMN about the structure and configuration of the communications network, the network management facility TMN selects one of the clock signals CLK1–CLK6 as a reference clock source for the network node NODE. The network management facility TMN notifies the selection to the central node clock generator SASE via the Q interface Q. The node clock generator SASE then synchronizes with the selected clock signal. Preferably, the network management facility TMN, based on the quality of the selected timing reference, also notifies the individual network elements NE1–NE6 which synchronization status message to send at their outputs (see Table 1). For the transmission of the synchronization status messages SSM1–SSM6, the existing Q interface between network elements and the network management facility TMN can be used.

The network elements NE1–NE6 preferably represent add-drop multiplexers and a crossconnect. The network node may be constituted by the network elements installed in a switching center of the synchronous digital communications network through which the switching center routes its toll traffic. The node clock generator SASE is preferable incorporated in the crossconnect and is additionally used as an internal clock generator of the crossconnect. The node clock generator is responsible for the conditioning and distribution of the uniform reference clock signal REF of the network node NODE. Like the network elements, it is connected to the network management facility TMN via the Q interface. If the node clock generator SASE is designed as a self-contained device, it can also be considered as a network element within the spirit of the invention, in which case its input signals are the clock signals CLK1–CLK6 received from the other network elements of the node. The clock signals may be 2-MHz signals or 2-Mb signals, in which the synchronization status message can also be transmitted to the node clock generator.

It is also possible that in the event of a failure, one or more of the network elements NE1–NE6 turn off the respective clock signals CLK1–CLK6 being sent by them to the node clock generator SASE. This function is called "squelching" If this is the clock signal with which the node clock generator is synchronizing, it is necessary to make a new selection. The node clock generator determines that the input signal with which it is synchronizing has failed, and notifies the network management facility TMN that a new selection is necessary. The network management facility TMN then makes the selection using the method according to the invention, and notifies the new selection to the node clock generator SASE via the Q interface Q. In the meantime, the node clock generator switches to the unsynchronized node (so-called holdover mode).

What is claimed is:

1. A method of synchronizing network elements in a synchronous digital communications network, said method comprising:
   receiving a number of synchronous digital message signals at inputs of a network element;
   evaluating at the network element respective synchronization status messages contained in the synchronous digital message signals;
   transmitting the synchronization status messages from the network element to a central network management facility;
   selecting at said central network management facility one of the synchronous digital message signals as a timing reference based on the synchronization status messages received from the network element and further based on stored information about the structure of the communications network;
   notifying the network element of the selected timing reference;
   deriving at the network element a clock signal from the selected message signal; and
   synchronizing the network element based on the derived clock signal.

2. The method as claimed in claim 1, wherein the network management facility further notifies the network element which synchronization status message to send at outputs.

3. The method as claimed in claim 1, wherein the network element whose reference clock source has failed switches to the unsynchronized mode until the network element is notified by the network management facility that another one of the received synchronous digital message signals has been selected as a new reference clock source.

4. The method as claimed in claim 1,
   wherein the network elements are arranged in a network node,
   wherein the network node comprises a central node clock generator and wherein the network management facility notifies the node clock generator rather than the individual network elements with which of the message signals received at one of the network elements of the network node it is to synchronize; and
   then synchronizes with a clock signal derived from the selected message signal, and distributes to the network elements of the network node a reference clock signal, with which said network elements synchronize.

5. A method as claimed in claim 4, wherein the central node clock generator is incorporated in one of the network elements of the network node.

6. A network element for a synchronous digital communications network, comprising:
   a receiving unit configured to receive synchronous digital message signals;
   a reading unit configured to read respective synchronization status message contained in the synchronous digital message signals;
   a transmitting unit configured to transmit the read synchronization status messages to a central network management facility for the purpose of selecting one of the received synchronous digital message signals as a timing reference based on the synchronization status messages transmitted from the transmitting unit and further based on stored information about the structure of the communications network;
   a notification unit configured to receive a notification from the network management facility relating to the selection made of the received synchronous digital signals;
   a clock signal unit configured to derive at least one clock signal from at least one of the received synchronous digital message signals; and
   an adjusting unit configured to adjust the internal clock generator with the derived clock signal.

7. A network management facility for controlling network elements of a synchronous digital communications network, comprising:
   means for receiving synchronization status messages transmitted by the network elements;
   means for storing information about the structure and configuration of the communications network;
   means for selecting a timing reference for at least one of the network elements based on the transmitted synchronization status messages and on the stored information; and
   means for transmitting a notification relating to the selection made to the at least one network element, whereupon said network element is synchronized with a clock signal derived from the selected message signal.

* * * * *